United States Patent
Mullins et al.

(10) Patent No.: US 8,020,372 B2
(45) Date of Patent: Sep. 20, 2011

(54) APPARATUS AND METHOD FOR OPTIMIZING EXHAUST TEMPERATURE CONTROL IN A VEHICLE DURING PARTICULATE FILTER REGNERATION

(75) Inventors: Jason Daniel Mullins, Howell, MI (US); Thomas LaRose, Jr., Redford, MI (US); James M. Perrin, Livonia, MI (US); Paul Jasinkiewicz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 539 days.

(21) Appl. No.: 12/244,976

(22) Filed: Oct. 3, 2008

(65) Prior Publication Data
US 2010/0083639 A1    Apr. 8, 2010

(51) Int. Cl.
*F01N 3/00* (2006.01)
(52) U.S. Cl. ............. 60/285; 60/274; 60/295; 60/300; 60/286
(58) Field of Classification Search .............. 60/274, 60/285–287, 295–301
See application file for complete search history.

(56) References Cited

U.S. PATENT DOCUMENTS

| | | | | |
|---|---|---|---|---|
| 6,758,037 | B2* | 7/2004 | Terada et al. | 60/295 |
| 7,243,491 | B2* | 7/2007 | Okugawa et al. | 60/311 |
| 7,412,822 | B2* | 8/2008 | Zhan et al. | 60/295 |
| 7,594,392 | B2* | 9/2009 | Wang et al. | 60/285 |
| 7,654,079 | B2* | 2/2010 | Ruth et al. | 60/286 |
| 7,748,214 | B2* | 7/2010 | Ishii et al. | 60/295 |

* cited by examiner

*Primary Examiner* — Thomas Denion
*Assistant Examiner* — Jesse Bogue
(74) *Attorney, Agent, or Firm* — Quinn Law Group, PLLC

(57) ABSTRACT

A method controls an exhaust gas temperature from a vehicle engine during regeneration of particulate filter (PF) in a vehicle having an oxidation catalyst (OC) and a selective catalytic reduction catalyst (SCR). The method ensures that a final OC temperature does not exceed a maximum of the target OC outlet temperature and a calibrated maximum OC outlet temperature. An apparatus for controlling a temperature of the exhaust gas includes sensors for measuring a temperature within the exhaust system and a controller having an algorithm, an OC temperature lookup table, and a PF temperature lookup table. The algorithm calculates a target OC outlet temperature using the lookup tables and a delayed error value that compensates for a thermal mass of the SCR. Actual OC outlet temperature is limited during regeneration of the PF to the lesser of the target OC outlet temperature and a calibrated maximum OC outlet temperature.

14 Claims, 2 Drawing Sheets

APPARATUS AND METHOD FOR OPTIMIZING EXHAUST TEMPERATURE CONTROL IN A VEHICLE DURING PARTICULATE FILTER REGNERATION

TECHNICAL FIELD

The present invention relates to a system and a method for controlling the temperature of an exhaust gas in a vehicle during regeneration of a particulate filter.

BACKGROUND OF THE INVENTION

In a vehicle powered by an internal combustion engine of a type known in the art, a particulate filter can be positioned within the vehicle exhaust system to remove particulates before the particulate matter can be exhausted into the atmosphere. Such a particulate filter can be relatively efficient at capturing and retaining microscopic particles of soot, ash, sulfates, metallic particles, and/or any other particulate matter that is commonly generated as a byproduct of the fuel combustion process. While diesel engines most commonly employ such a filter, known widely as a diesel particulate filter or DPF, certain gasoline engine designs such as direct injection or DI engines can also utilize a similar particulate filter. A highly efficient particulate filter, regardless of the fuel type, can plug relatively quickly when exposed to large amounts of particulate, thus producing an increased differential pressure across the particulate filter. To alleviate this, the particulate filter can be replaced according to a predetermined maintenance cycle, or more commonly can be regenerated to extend the life of the filter.

A particulate filter, abbreviated hereinafter as PF for simplicity, can be regenerated by burning or oxidizing the accumulated particulate matter using a catalyst. The regeneration process takes place when the temperature in the PF is elevated above a threshold of approximately 450 degrees Celsius (° C.). During PF regeneration the temperature in the exhaust gas or exhaust stream is raised to this threshold level in order to facilitate the regeneration process. One way to accomplish such a temperature rise is by utilizing an oxidation catalyst (OC) in conjunction with increased hydrocarbon loading in the flow of exhaust gas upstream of the PF.

Within the OC itself, a chemical process breaks down the increased hydrocarbons into relatively inert byproducts or compounds. For example, a typical OC can use palladium or various platinum catalysts to reduce the levels of hydrocarbons by means of a simple oxidation process. This process is exothermic in nature, which results in an increased exhaust gas temperature. A temperature sensor can be used at the outlet of the OC, and control of the outlet temperature can be accomplished by adjusting the amount or level of hydrocarbons introduced into the exhaust stream. This method of temperature control is generally sufficient when the inlet to the PF or is located directly downstream of the OC outlet. However, the same method of temperature control can be less than optimal under certain circumstances, such as when a relatively large thermal mass is present between the OC outlet and the PF inlet.

SUMMARY OF THE INVENTION

Accordingly, a method and an apparatus are provided for optimizing the temperature control of an exhaust gas or exhaust stream of a vehicle engine. The apparatus controls the temperature of the exhaust gas within the exhaust system during regeneration of the particulate filter (PF). The apparatus includes the PF itself, an oxidation catalyst (OC), and a selective catalytic reduction catalyst or SCR located between the OC and the PF within the exhaust stream. The SCR provides the relatively large thermal mass mentioned above. The PF can be selectively regenerated using the OC, with the SCR being adapted to convert nitrogen oxides or NOx gasses into relatively inert or harmless byproducts. Using the method and system of the invention, the occurrence and/or severity of any temperature overshoot or oscillation is minimized. Likewise, any after-treatment hardware, i.e., hardware or other devices which capture and/or treat other gasses or byproducts downstream of the PF are sufficiently protected from such a temperature overshoot.

The exhaust system further includes a controller and a plurality of sensors each adapted to measure a temperature within different areas or portions of the exhaust system, including downstream of the OC and upstream of the PF. The controller includes an algorithm, and can also include a OC temperature and a PF temperature lookup table to determine a pair of temperature set points as described below. If the lookup tables are not used, the apparatus can alternately utilize one or more curves and/or a scalar calibration function or other suitable function. The algorithm is executed to thereby calculate a target OC outlet temperature using the data extracted from the lookup tables, or alternately from the alternative curve and/or function. The algorithm limits the actual OC outlet temperature during regeneration of the PF to the lesser of a calculated target OC outlet temperature and a calibrated maximum OC outlet temperature.

Two feedback control loops are used to control the temperature of the PF inlet. The primary loop control variable is the outlet temperature of the OC. This particular loop controls the outlet temperature of the OC to a predetermined or calibrated first temperature "set point" by varying the concentration of the hydrocarbons in the exhaust gas, for example by using in-cylinder means, an external hydrocarbon dosing device, or other suitable methods. The secondary control loop utilizes an additional temperature sensor positioned at the outlet of the SCR, or alternately at the inlet of the PF. The secondary control loop utilizes a second temperature set point, which can be subtracted from a measured PF inlet temperature to thereby calculate an error value or term. The error term can then be filtered or processed in any manner that increases system stability, before being added to the first temperature set point. Temperature control at the inlet of the PF is thus optimized while protecting against temperature overshoot.

In using the method and system of the invention, two desired or calibrated temperature set points are determined: a first temperature set point for the OC outlet temperature, and a second temperature set point for the PF inlet temperature. The exhaust temperature is first controlled via the first temperature set point and allowed to stabilize, such as but not limited to waiting for a predetermined interval to elapse, or a timer to expire. Once the exhaust temperature stabilizes, the arithmetic difference between a measured PF inlet temperature and its calibrated temperature set point is calculated. This value, referred to hereinafter as the error term, can be filtered as needed in order to increase system stability, and then added back to the OC outlet temperature set point, i.e., the first temperature set point. As a result, the concentration of hydrocarbons in the exhaust flow can be indirectly adjusted to control the temperature in the PF.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
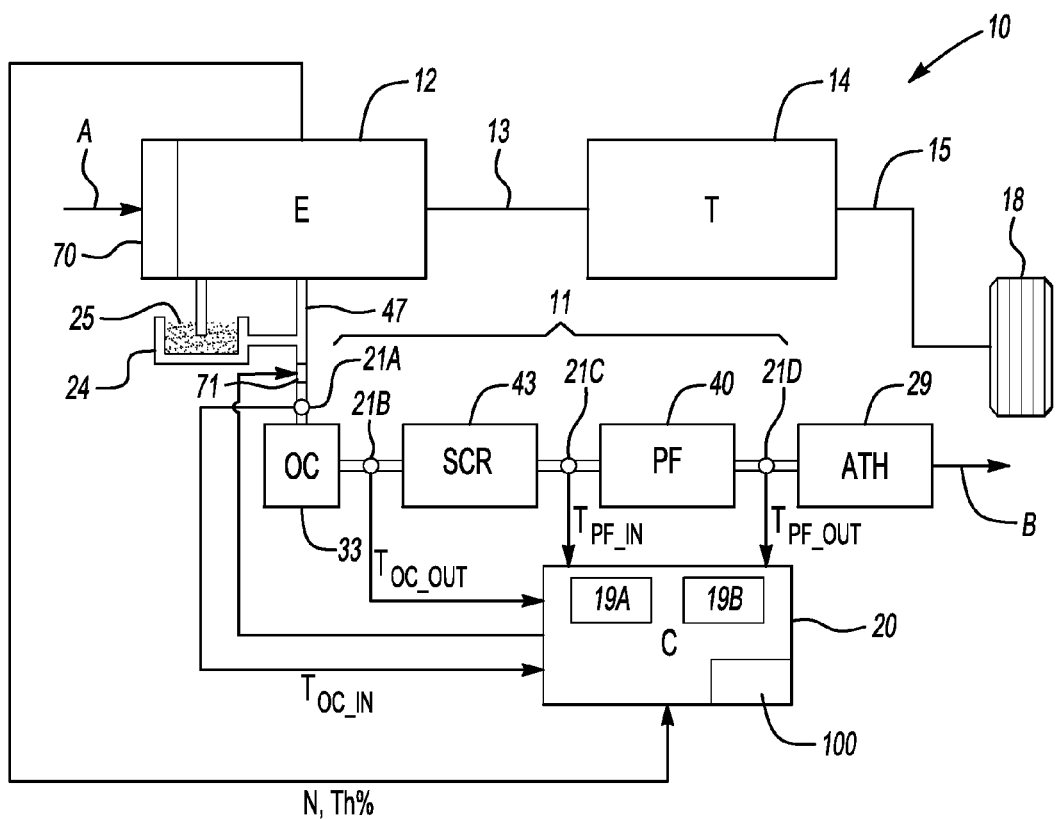
FIG. 1 is a schematic illustration of a vehicle having an engine and an exhaust system that is controllable via the apparatus and method of the invention.

Referring to the drawings wherein like reference numbers represent like components throughout the several figures, and beginning with FIG. 1, a vehicle 10 includes an engine (E) 12 and a transmission (T) 14. The engine 12 is configured as a conventional internal combustion engine, and therefore is operable for combusting a supply of fuel 25 drawn from a sump or a tank 24. The fuel 25 can be diesel or gasoline depending upon the configuration of the engine 12. The engine 12 has a governor or a throttle 70 operable for admitting a predetermined amount or percentage of the fuel 25 and air (arrow A1) as needed into the engine 12 depending on the position of the throttle 70, as will be understood by those of ordinary skill in the art. Combustion of the fuel 25 generates exhaust (arrow B), which is subsequently discharged through an exhaust manifold or a pipe 47 into an exhaust system 11. Energy released by the combustion of the fuel 25 produces a rotational force or torque on an input member 13 of the transmission 14. The transmission 14 in turn transfers the torque from the engine 12 to an output member 15 in order to propel the vehicle 10 via a set of drive wheels 18.

The system 11 cleans and conditions the exhaust (arrow B) generated during combustion of the fuel 25, and includes an oxidation catalyst (OC) 33, a selective catalytic reduction catalyst (SCR) 43, and a particulate filter (PF) 40 as described below. As used herein, the term "cleaning" refers to the removal of any suspended particulate aerosols or matter from the exhaust (arrow B), and therefore the system 11 is configured to direct or route the exhaust (arrow B) through the PF 40. The PF 40 can be configured as ceramic foam, metal mesh, pelletized alumina, or any other suitable material or combination of materials. The exhaust (arrow B) can also be cleaned using optional after-treatment hardware (ATH) 29 adapted for capturing and/or removing other compounds from the exhaust (arrow B) as needed.

Also as used herein, the term "conditioning" refers also to the control and/or the regulation of the temperature of the exhaust (arrow B) at various positions within the system 11. To that end, the PF 40 is connected to or formed integrally with the OC 33, with the OC 33 being in communication with an external fuel injector device or external injector 71 that is operable for delivering a controllable amount of the fuel 25 into the OC 33 as needed. Within the OC 33, the fuel 25 is burned to thereby generate sufficient levels of heat for regenerating the PF 40.

That is, the OC 33 acts in the presence of a controlled temperature of the exhaust (arrow B) to oxidize, burn, or otherwise remove any hydrocarbons that are introduced into the exhaust stream or flow. This provides a sufficient temperature level in the PF 40 for oxidizing any particulate matter which has been trapped by the PF 40 downstream of the OC 33. The PF 40 is thus kept relatively free of potentially-clogging particulate matter which might otherwise affect the performance of the vehicle 10.

Positioned between the OC 33 and the PF 40 is a conventional SCR 43. The SCR 43 is a selective catalytic reduction device or unit of the type known in the art which is operable for converting nitrogen oxides or NOx gasses into water and nitrogen as byproducts using an active catalyst. The SCR 43 may be configured as a ceramic brick or a ceramic honeycomb structure, a plate structure, or any other suitable design.

Regardless of the particular configuration or construction of the SCR 43, the SCR 43 is a relatively large thermal mass positioned between the OC 33 and the PF 40 within the system 11. Therefore, in order to compensate for the known thermal mass of the SCR 43, a calibrated time delay or delayed temperature response is introduced as the exhaust gas slowly heats the SCR 43. Using the inlet temperature to the PF 40 as the primary feedback variable for controlling the exhaust temperature in the system 11 in the conventional manner can substantially increase the occurrence of a temperature overshoot in the OC 33 and the SCR 43. To minimize the occurrence of such an overshoot, the system 11 therefore includes an electronic control unit or controller 20 having a temperature optimization algorithm or a method 100. The system 11 may include a pair of maps or lookup tables 19A, 19B, which will be described below with reference to FIGS. 2 and 3. In lieu of the lookup tables 19A, 19B of FIG. 1, the system 11 can alternately include one or more curves (not shown), and/or a scalar calibration function or other suitable functions as needed, also as described below.

The controller 20 can be configured as a general-purpose digital computer or as a proportional-integral-derivative (PID) controller device generally comprising a microprocessor or a central processing unit (CPU), read-only memory (ROM), random access memory (RAM), electrically programmable read only memory (EPROM), a high speed clock, analog-to-digital (A/D) and/or digital-to-analog (D/A) circuitry, and any input/output circuitry or devices, as well as any appropriate signal conditioning and buffer circuitry. The method 100 and any required reference calibrations are stored in ROM within the controller 20, and are readily executed to provide the respective functions described below with reference to FIGS. 2 and 3.

The controller 20 receives input signals from various temperature sensors 21A-D positioned at different locations within the system 11, including the sensor 21B directly downstream of the OC 33 and the sensor 21C directly upstream of the PF 40, with the sensors 21A-D being operable for detecting, measuring, or otherwise determining a temperature of the exhaust (arrow B) at different positions or locations within the system 11.

In particular, the sensor 21A is positioned in proximity to the engine or inlet side of the OC 33, and measures or detects an inlet temperature into the OC 33. This temperature is abbreviated hereinafter for simplicity as $T_{OC\_IN}$. The sensor 21B detects an outlet temperature from the OC 33, with this temperature being abbreviated hereinafter for simplicity as $T_{OC\_OUT}$. The sensor 21C detects an inlet temperature to the PF 40, with this temperature being abbreviated hereinafter for simplicity as $T_{PF\_IN}$. Finally, the sensor 21D detects an outlet temperature from the PF 40, with this temperature being referred to herein as $T_{PF\_OUT}$. These temperature signals are each transmitted by or relayed from the sensors 21A-D to the controller 20 for use by the method 100 of FIG. 3. The controller 20 is also in communication with the engine 12 to receive as additional signals that identify the operating point of the engine 12, such as the throttle position, level, or percentage (Th %), the engine speed (N), accelerator pedal position, fueling quantity, requested engine torque, etc.

Figure 2:
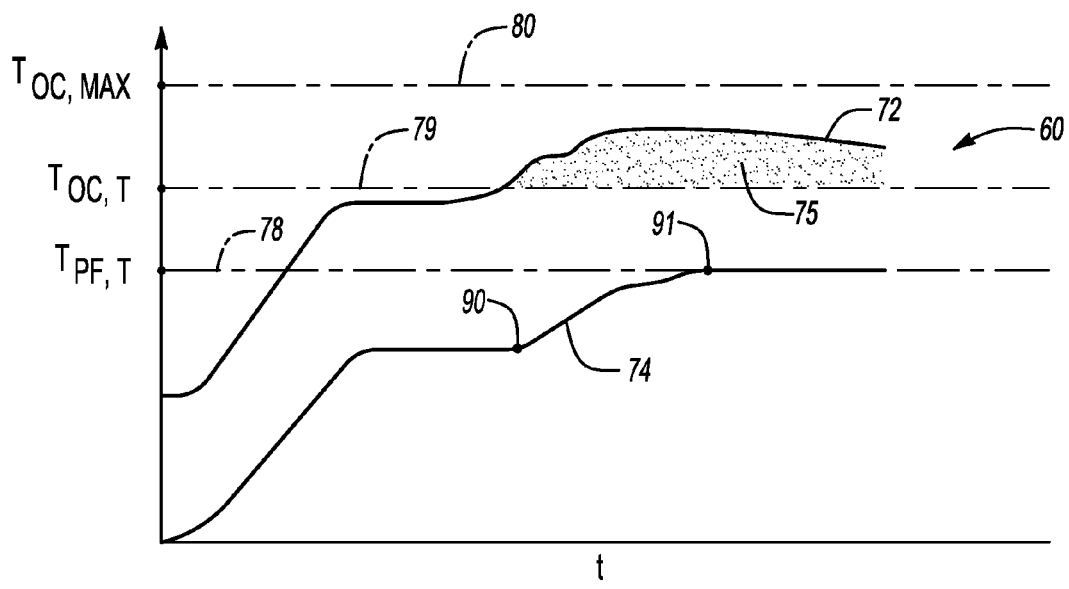
FIG. 2 is a graphical illustration or a representative set of curves describing an exemplary temperature relationship between an oxidation catalyst (OC) and particulate filter (PF) within the vehicle of FIG. 1.

Referring to FIG. 2, a representative set of traces 60 generally describes an exemplary temperature relationship between the OC 33 and the PF 40 of the vehicle 10 shown in FIG. 1. The Y-axis includes predetermined or calibrated values including but not necessarily limited to: a calibrated maximum temperature level within the OC 33, represented as the line 80 or $T_{OC,\,MAX}$; a desired or target temperature of the OC 33, represented as the line 79 or $T_{OC,\,T}$; and a desired or target temperature of the PF 40, represented as the line 78 or $T_{PF,\,T}$.

The X-axis represents time, abbreviated (t) in FIG. 2. The trace 74 represents the actual or measured inlet temperature of the PF 40, i.e., $T_{PF\_IN}$, as determined or measured by the sensor 21C of FIG. 1. The trace 72 represents the outlet temperature of the OC 33, i.e., $T_{OC\_OUT}$ as determined or measured by the sensor 21B of FIG. 1. In order to raise the inlet temperature of the PF 40, i.e., $T_{PF\_IN}$, from point 90 of trace 74, i.e., from a level where trace 74 initially plateaus to a point 91, or the level of the calibrated value represented by line 78, i.e., $T_{PF,\,T}$, the method 100 of FIG. 3 includes compensating for the known thermal mass of the SCR 43, and thus controlling the trace 74, i.e., the controlled outlet temperature of the OC 33 or $T_{OC,\,OUT}$ of FIG. 1, within a range indicated generally by the shaded area 75 up to a calibrated ceiling or maximum value or $T_{OC,\,MAX}$ represented by the line 80.

Figure 3:
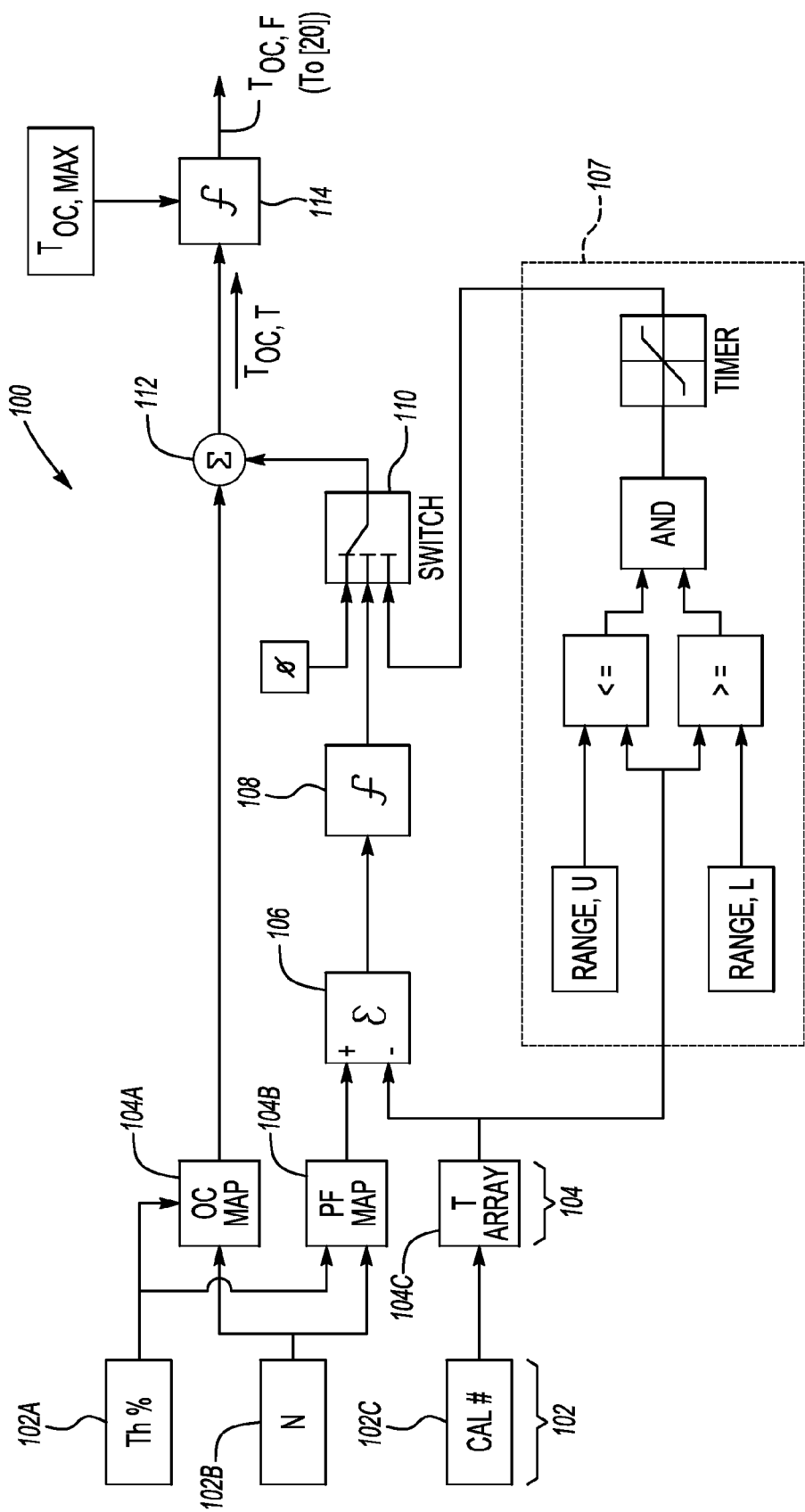
FIG. 3 is a schematic illustration of a flow of information or a control sequence according to the method of the invention.

Referring to FIG. 3 together with the vehicle 10 of FIG. 1, the method 100 begins with step 102, which includes each of the steps 102A, 102B, and 102C. At step 102, a set of predetermined operating values of the vehicle 10 are measured, detected, calculated, or otherwise determined, and are temporarily stored within the controller 20. Such values can be measured at different locations in the vehicle 10, such as by measuring an amount of fuel or throttle percentage (Th %) of the throttle 70 at step 102A and a speed (N) of the engine 12 at step 102B. At step 102C, a calibrated integer value (CAL #) can be selected depending on the corresponding array position of a desired associated value, as will be described at step 104 below. Typically, an integer known to correspond to the inlet temperature of the PF 40 is selected at step 102C, although other temperature values, and thus other corresponding array positions, can be selected within the scope of the invention. The method 100 then proceeds to step 104, which includes each of the steps 104A-C.

At step 104, the method 100 includes selecting a corresponding predetermined or calibrated value or set point for each of the OC outlet temperature and the PF inlet temperature. Step 104 can be accomplished by various means, such as by accessing a lookup table such as the lookup tables 19A, 19B of FIG. 1, referencing an array, by calculation using various functions as described above, and/or by other suitable means. At step 104A, for example, the throttle value (Th %) determined at step 102A and the engine speed (N) determined at step 102B are used as inputs into a first map or a lookup table 19A corresponding to the OC 33, and the resultant value is transferred to step 112. At step 104B, the values from steps 102A and 102B, respectively, are input into a second map or a lookup table 19B corresponding to the PF 40, and the resultant value is transferred to step 106. Finally, at step 104C the calibrated value (CAL #) from step 102C is input into an array, and a corresponding measured temperature value for an inlet or an outlet of one of the PF 40 and the OC 33 is transferred to steps 106 and 107. The method 100 then proceeds to steps 106, 107, and 112.

At step 106, the measured value determined via the array at step 104C is subtracted from the value determined from the PF map at step 104B in order to determine an error value or an error term, which is then passed or fed forward to step 108. For example, a first temperature set point can be selected for the OC outlet temperature as described above, while a second temperature set point can be selected for the PF inlet temperature. After the temperature in the exhaust stream stabilizes, such as by allowing a timer to expire or a predetermined interval to elapse, the arithmetic difference between the measured PF inlet temperature and its calibrated second temperature set point can be calculated as the error term. The method 100 then proceeds to step 108.

At step 107, the value selected from the array at step 104C is compared to a calibrated range or set of allowable max/min values in order to determine if the selected value falls within the upper and lower limits of the range, i.e., [Range U, Range L]. If the value from step 104C is less than the upper range value (Range U) and greater than the lower range value (Range L), the method 100 includes starting a timer to allow a predetermined interval to elapse. Step 107 provides a sufficient buffer compensating for the temperature effect of the relatively large thermal mass of the SCR 43 (see FIG. 1).

Alternately, the thermal mass of the SCR 43 can be accounted for as a function of exhaust gas flow, with different "wait" times used for different engine operating points. Similarly, the lookup tables 19A, 19B include data which accounts for or compensates for any expected temperature drop across the SCR 43. At step 107, after the timer has expired or any other alternative thermal mass-compensating steps have concluded, an activation signal or switching signal (arrow S) is passed or fed forward to step 110.

At step 108, the error term from step 106 is filtered in order to take a running average of the error values so as not to respond unnecessarily to large but transient error values. Step 108 can include, but is not limited to, passing the error term through a first order filter, calculating a running average of error terms, etc. In this manner system stability can be further optimized. The filtered error term value is then fed forward to step 110.

At step 110, a constant value of zero is continuously passed or fed forward to step 112 until the switching signal (arrow S) from step 107 is received. When the switching signal (arrow S) is received, the error term determined at step 108 is passed or fed forward to step 112.

At step 112, the value from step 104A, which was selected from an OC map or lookup table as described above, is added to the error term which was fed forward from step 110. The total value, which corresponds to a target outlet temperature of the OC 33 or $T_{OC,\,T}$ (see line 79 of FIG. 2), is then fed forward to step 114.

At step 114, the target outlet temperature of the OC 33 or $T_{OC,T}$, is compared to a calibrated maximum value for the OC 33, or $T_{OC,\,MAX}$, which corresponds to line 80 of FIG. 2. The method 100 then includes feeding forward the minimum of the values $T_{OC,\,T}$ and $T_{OC,\,MAX}$. This value, represented in FIG. 2 as the trace 74, is the final temperature of the OC 33, represented in FIG. 3 as $T_{OC,F}$. This value is then passed to a suitable portion of the controller 20 or to another control device which controls the percentage of the fuel 25 of FIG. 1 which is diverted to the external injector 71 or through in-cylinder injectors (not shown).

A general example is presented by way of a situation in which the calibrated maximum OC temperature or $T_{OC,\,MAX}$ is equal to 700° C., and the first temperature set point from step 104A is equal to 650° C. An exemplary array value of 2 at step 102 can correspond to a measured PF inlet temperature in an array at step 104. This value, abbreviated as $T_{PF\_IN}$ below, is equal to 650° C. for the purposes of the present example. A desired or calibrated second temperature set point for the PF inlet temperature can then be selected or determined at step 104B as 648° C. In this example, step 106 would then generate a value of ($T_{PF\_IN}$–Set Point 2) or (650° C.–648° C.)=2° C. Therefore, 2° C. becomes the error term fed forward from step 106.

When the value of the temperature measurement determined at step 104C, here 650° C., falls within a predetermined range [Range U, Range L] at step 107, the error value of 2° C. can be filtered through a first order filter or other suitable filter at step 108 and through a switch or logic gate at step 110, before being added to the first temperature set point determined at step 104A, or 650° in this particular example. The output value, or (650° C.+2° C.)=652° C., is set as the target OC outlet temperature or $T_{OC,\ T}$, then compared to a calibrated maximum value, such as 700° C. The minimum of these two values, i.e., 652° C., is then fed forward to the controller 20 as the value $T_{OC,\ F}$ (see line 72 of FIG. 2). As will be understood by those of ordinary skill in the art, the value $T_{OC,\ F}$ can be used by the controller 20 to calculate, look up, or otherwise determine an appropriate volumetric or mass flow of fuel 25 needed for injection via the external injector 71 or in-cylinder injectors (not shown) to be burned in the OC 33 in order to achieve the final temperature $T_{OC,\ F}$.

While the best modes for carrying out the invention have been described in detail, those familiar with the art to which this invention relates will recognize various alternative designs and embodiments for practicing the invention within the scope of the appended claims.

The invention claimed is:

1. A method for controlling a temperature of an exhaust gas from a vehicle engine during regeneration of a particulate filter (PF) in a vehicle having an oxidation catalyst (OC), a selective catalytic reduction catalyst (SCR), and the PF, the method comprising:
adjusting a concentration of hydrocarbons in the exhaust gas to thereby achieve a first temperature set point;
determining a second temperature set point corresponding to a PF inlet temperature;
subtracting the second temperature set point from a measured PF inlet temperature to thereby calculate an error term;
adding the error term to the first temperature set point to thereby determine a target OC outlet temperature; and
executing a control action during the regeneration of the PF to thereby ensure that a final OC temperature does not exceed a maximum of the target OC outlet temperature and a calibrated maximum OC outlet temperature.

2. The method of claim 1, further comprising determining the first temperature set point using an OC outlet temperature.

3. The method of claim 1, further comprising filtering the error term prior to adding the error term to the first temperature set point.

4. The method of claim 3, further comprising introducing a calibrated time delay prior to calculating the error term, the calibrated delay being sufficient to compensate for a known thermal mass of the SCR.

5. The method of claim 1, wherein determining the first and the second temperature set points includes selecting each of the first and the second temperature set points from a corresponding lookup table, each of the lookup tables being indexed by a plurality of predetermined operating values of the engine.

6. The method of claim 5, wherein the plurality of predetermined operating values of the engine include: a throttle position, an accelerator pedal position, a fueling quantity, a requested engine torque, and a speed of the engine.

7. The method of claim 1, further comprising:
comparing the measured PF inlet temperature to a calibrated range of allowable PF inlet temperatures;
adding the error term to the first temperature set point only when the measured PF inlet temperature is within the calibrated range of allowable PF inlet temperatures; and
using the calibrated maximum OC temperature as the target OC temperature only when the measured value is not within the calibrated range of allowable PF inlet temperatures.

8. The method of claim 1, wherein executing a control action includes controlling an amount of fuel that is burned by the OC during the regeneration of the PF.

9. A method for controlling a temperature of an exhaust gas from an engine during regeneration of a particulate filter (PF) in a vehicle having an oxidation catalyst (OC), a selective catalytic reduction catalyst (SCR), and the PF, the method comprising:
selecting a first temperature set point from a first lookup table, the first temperature set point corresponding to an OC outlet temperature;
selecting a second temperature set point from a second lookup table, the second temperature set point corresponding to a PF inlet temperature;
measuring an actual PF inlet temperature;
subtracting the second temperature set point from the actual PF inlet temperature to calculate an error term;
filtering the error term to thereby compensate for a known thermal mass of the SCR;
adding the error term to the first temperature set point to determine a target OC outlet temperature; and
controlling an actual OC outlet temperature during the regeneration of the PF such that the actual OC outlet temperature does not exceed a maximum of the target OC outlet temperature and a calibrated maximum OC outlet temperature.

10. The method of claim 9, wherein filtering an error term includes one of: passing the error term through a first order filter and calculating a running average of a plurality of the error terms.

11. The method of claim 9, wherein calculating the first and the second target OC outlet temperature includes:
measuring at least one engine value selected from the group consisting of: a throttle position, an accelerator pedal position, a fueling quantity, and a requested engine torque;
measuring a speed of the engine; and
selecting a calibrated OC temperature from a lookup table which is indexed by the at least one engine value and the speed of the engine.

12. An apparatus for controlling a temperature of an exhaust gas within an exhaust system of a vehicle engine during regeneration of a particulate filter (PF), the exhaust system having an oxidation catalyst (OC), a selective catalytic reduction catalyst (SCR), and the PF, the apparatus comprising:
a plurality of sensors each operable for measuring a temperature within a different portion of the exhaust system; and
a controller having an algorithm, a OC outlet temperature lookup table, and a PF inlet temperature lookup table, each of the lookup tables being indexed by a plurality of engine operating values;
wherein the algorithm is adapted to calculate a target OC outlet temperature using data from each lookup table, the target OC outlet temperature compensating for a thermal mass of the SCR; and wherein the algorithm limits an actual OC outlet temperature during regeneration of the PF to the lesser of the target OC outlet temperature and a calibrated maximum OC outlet temperature.

13. The apparatus of claim 12, wherein the algorithm calculates an arithmetic difference between a temperature set point selected from the PF lookup table and a measured PF inlet temperature, and adds the difference to another temperature set point selected from the OC lookup table to thereby determine the value of the target OC outlet temperature.

14. The apparatus of claim 12, including a fuel injector in communication with a supply of fuel and the controller;

wherein the controller is operable for calculating an amount of the fuel needed for generating the lesser of the target OC outlet temperature and the calibrated maximum OC outlet temperature, and for commanding a delivery of the calculated amount of the fuel to the fuel injector.

* * * * *